May 28, 1968  R. KOLASINSKI  3,385,674
LATERAL FLOW ROCK SALT DISSOLVER AND METHOD
Filed Oct. 7, 1965  2 Sheets-Sheet 1
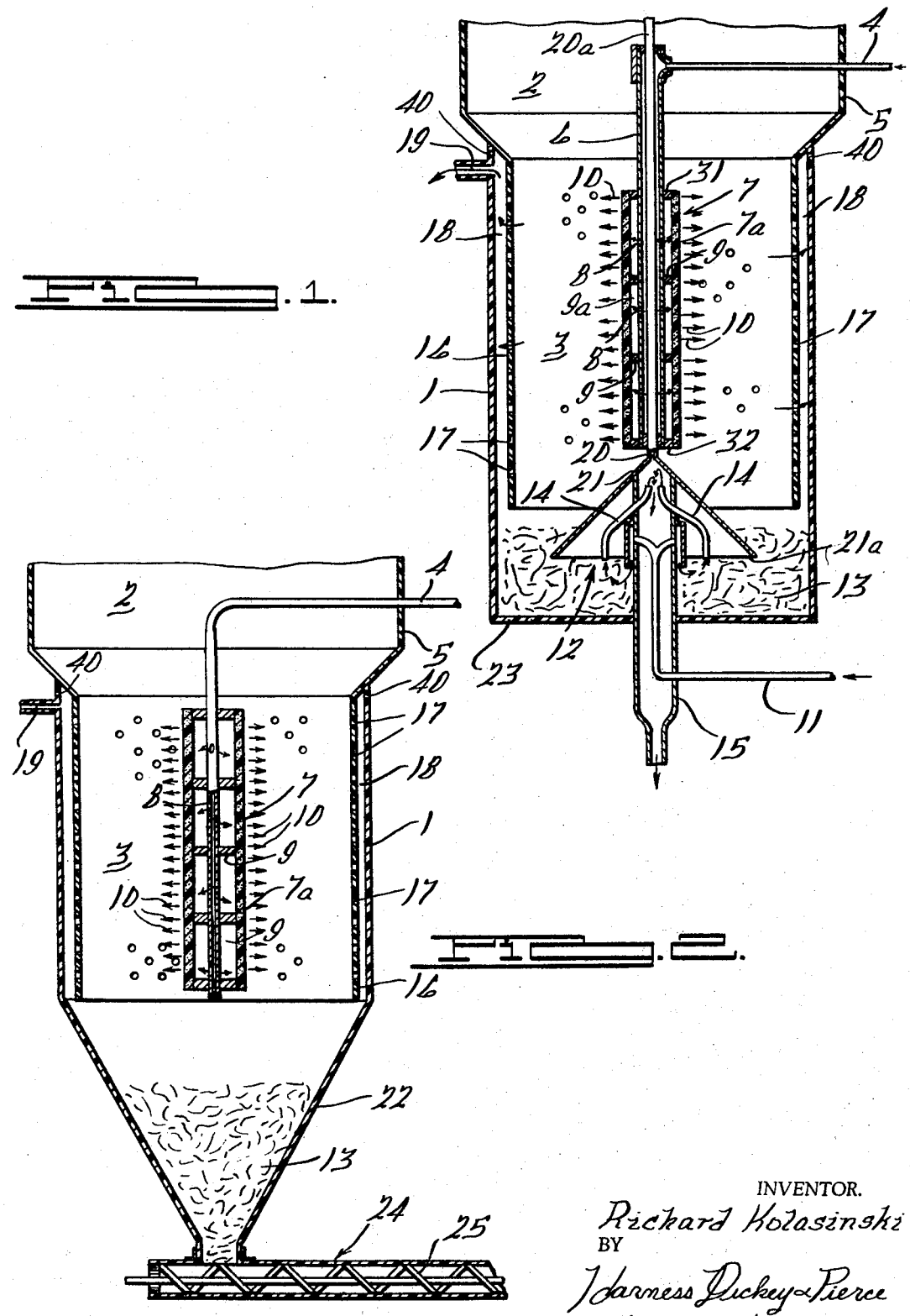

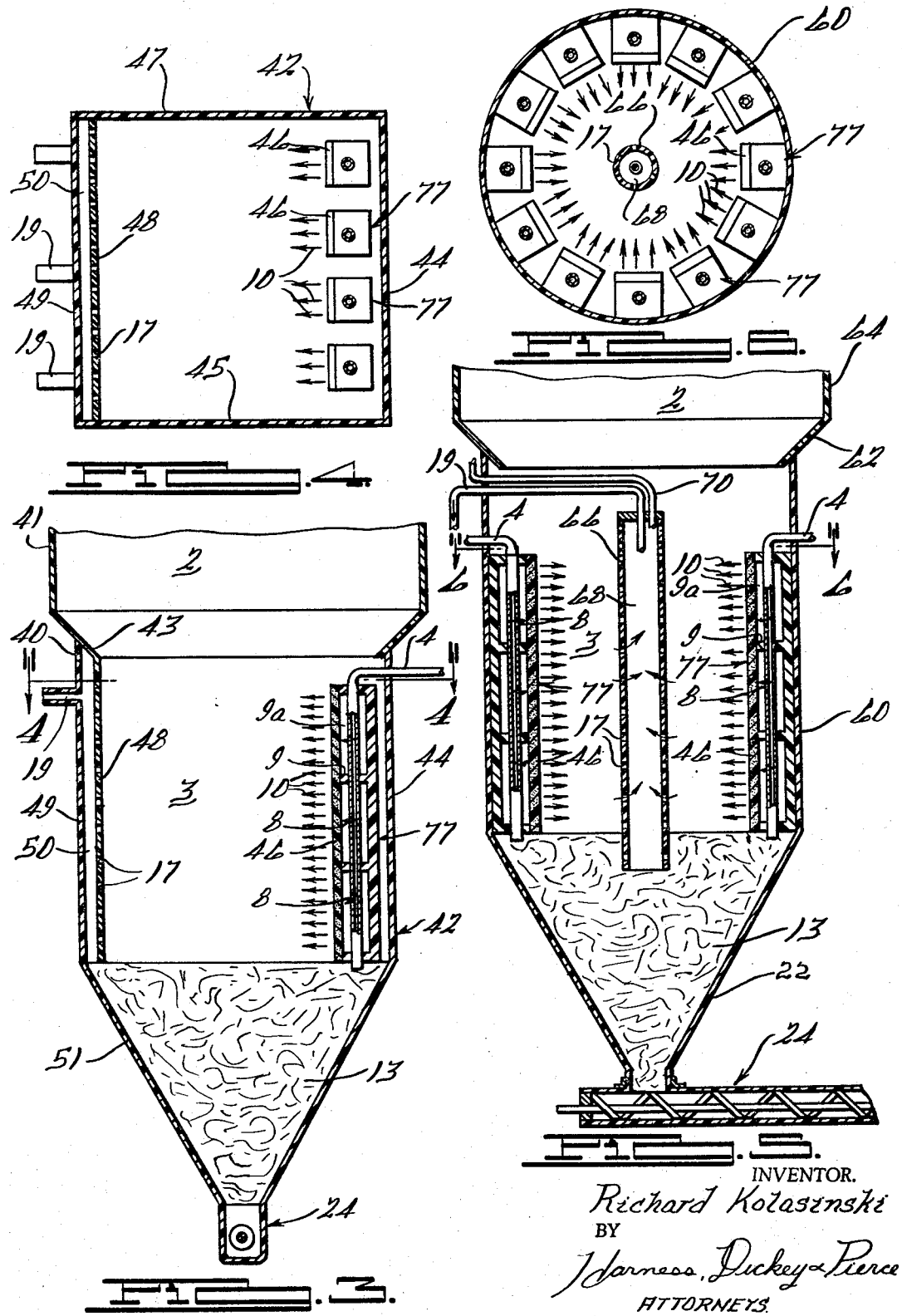

United States Patent Office 3,385,674
Patented May 28, 1968

3,385,674
LATERAL FLOW ROCK SALT DISSOLVER
AND METHOD
Richard Kolasinski, Richmond Township, Macomb County, Mich., assignor to Diamond Crystal Salt Company, St. Clair, Mich.
Filed Oct. 7, 1965, Ser. No. 493,706
5 Claims. (Cl. 23—312)

ABSTRACT OF THE DISCLOSURE

A lateral flow rock salt dissolver for use in forming brine substantially free from impurities such as calcium sulfate comprising a vessel for holding a salt bed and vertically disposed water distributing means for distributing water such that it flows into the salt bed and through the vessel in a generally lateral direction to thereby dissolve the salt, separate calcium sulfate impurities therefrom, and form brine said vessel also containing top located outlet means for removing the pure brine and bottom located outlet means for removing calcium sulfate impurities, sludge and the like from the dissolver; and, the method of dissolving rock salt to produce a brine substantially free of calcium sulfate through the utilization of the lateral flow of water to dissolve the rock salt and form calcium sulfate free brine.

This invention relates to an improved apparatus for dissolving rock salt. More particularly this invention relates to an improved method and apparatus for producing a purified brine which is low in impurities such as calcium sulfate.

In the past considerable work has been done in the development of apparatus and methods for production of brine with a low calcium sulfate content from various types of rock salt. For example, salt dissolvers known to the prior art can be found in the following U.S. patents: 2,280,466, 2,468,162, 1,807,263, 2,122,900, 2,412,560, 2,891,845, 1,736,890, 2,281,140 and 2,734,804. The various types of dissolvers described in these patents are discussed in chapter 14 of the Kaufmann text on Sodium Chloride, published by Reinhold Publishing Corporation. All of these dissolvers can be categorized as vertical flow dissolvers, that is, they are either of the upflow, upflow-downflow, or downflow type. Successful methods of obtaining a purified brine in the dissolvers of the prior art have been developed, but from a practical standpoint their use was limited to relatively coarse grades of rock salt. What was especially needed in the art was a rock salt dissolver which could be used on fine rock salt, as well as on the more coarse grades of rock salt. When the finer grades of rock salt which have a wide range of particle sizes are dissolved, certain problems are presented which are not encountered with the coarser grades. For example, there is considerably more resistance to the flow of water, and channeling is the rule rather than the exception in vertical flow dissolvers. This results in a decrease in the effectiveness of the dissolver apparatus being used, and brine concentration is lower than one would expect from the particular effective bed area of the dissolver being used for dissolving a finer grade rock salt. Also, in vertical up-flow dissolvers of the prior art a problem is presented with respect to the movement of sludge particles up into the bed resulting from the vertical flow. This in turn causes a mixing of the impurities with the brine in which the impurities readily dissolve. Therefore, it has long been sought in the art to have apparatus and methods for the continuous dissolving of fine rock salt, which apparatus and methods would enable the production of brine from the rock salt which brine would be considerably lower in calcium sulfate content than the 3,000 parts per million of brine which would be produced if such salt were dissolved in a pit.

The object of the invention is to avoid the disadvantages and difficulties referred to above and to provide an apparatus for dissolving rock salt to produce brine wherein the flow of water through the apparatus is in a lateral direction.

Another object is to provide a method for dissolving rock salt to produce brine which method utilizes a lateral flow of water to dissolve the salt.

Still further, it is an object of the present invention to provide an apparatus and method for dissolving rock salt that could be operated with fine rock salt, as well as with the more coarse grades of rock salt.

Still further, it is an object of the present invention to provide a rock salt dissolver apparatus and method which will enable the production of brine having a low concentration of impurities such as calcium sulfate.

Still another object of the invention is to provide a method and apparatus for dissolving rock salt which will enable the production of purified brine on a commercially practicable and acceptable basis.

Other objects, features and advantages of the present invention will become apparent from the subsequent description and the appended claims, taken in conjunction with the accompanying drawings, in which:

FIGURE 1 illustrates a lateral flow rock salt dissolver in a cutaway view;

FIGURE 2 illustrates a cutaway view of another embodiment of the invention comprising a lateral flow rock salt dissolver in which the bottom thereof is formed of a conical structure which leads to a screw conveyor for removing sludge impurities from the dissolver;

FIGURE 3 illustrates a cutaway view of another embodiment of the invention comprising a rock salt dissolver which is rectangular in shape and wherein the flow of water is in a lateral direction from one side to the other of the dissolver;

FIGURE 4 is a top view of the dissolver of FIGURE 3 along the line 4—4 thereof;

FIGURE 5 illustrates a cutaway view of another embodiment of the invention comprising a dissolver in which the lateral flow of water passes inwardly from the periphery of the vessel to an outlet generally disposed at the vessel center; and FIGURE 6 illustrates a cross-sectional view of the dissolver of FIGURE 5 along the line 6—6 thereof.

Broadly stated, the apparatus of the invention comprises a vessel into which the salt is introduced, and inlet means for feeding water into the vessel for contact with the salt. The water inlet communicates with water distributing means which allow the water to flow through the salt in a lateral direction to dissolve the salt and form brine. The dissolver vessel also contains outlet means for removing the brine formed, as well as means located close to the bottom of the vessel for removing impurities formed during the dissolving of the salt. The method of the invention, broadly stated, comprises contacting the salt in the dissolver vessel with water for dissolving the salt, wherein the water introduced into the dissolver vessel is distributed in such a manner as to thereby cause the water to flow through the salt bed in a lateral direction. The impurities or sludge formed during dissolving of the salt are then removed through an outlet located near the bottom of the dissolver, and the brine formed is removed through another outlet or outlets located in the upper part of the dissolver.

To more fully describe the apparatus of the invention, reference is now made to the lateral flow rock salt dissolver shown in FIGURE 1, wherein a cylindrical vessel 1 is shown containing a salt storage area 2 which is defined by the exterior walls of the vessel, and a salt bed area 3 generally defined by the perforated screen 16. A water inlet 4 is connected proximate to the top portion 5 of the vessel and this inlet communicates with a tubular conduit 6 which extends into the vessel to be disposed therein along the vertical axis of the vessel, and thereby form a water distributing means generally designated 7, which is located centrally within the vessel such that it is vertically disposed along the longitudinal axis thereof. By the terminology that the water distributing means is located centrally within the dissolver vessel, or that the distributing means is vertically disposed along the longitudinal axis of the vessel, it is meant that the water distributing means is located approximately in the center of the vessel and not more off center than an amount of about 15% of the width of the vessel. Of course, the cross-sectional shape of the vessel can be polygonal as well as circular. The water is passed into this water inlet pipe and downwardly along the central axis of the vessel, then through small holes 8 in the conduit 6, and then the water emanates outwardly through the tube or cylindrical conduit 7a, which forms the outer surface of the water distributing means 7, to flow through the salt bed in a lateral direction. The water distributing means 7 can be equally satisfactorily constructed from a number of different materials, such as for example, plastic, stainless steel and the like. In actual usage the water distributing means can be a unitary structure as shown in FIGURE 1, or it can equally satisfactorily be a series of units placed one above the other with each supplied from a separate water inlet. As shown in FIGURE 1, the outer structure of the water distributing means 7 is comprised of a porous plastic tube 7a which has openings of about 60 microns uniformly distributed completely over the outer cylindrical surface of the water distributing means between the top 31 and the bottom 32 thereof. The flow of the water out of the porous tube in a lateral direction is designated by the plurality of arrows 10. Baffles 9 are provided on the inside of the porous tube to form three separate chambers 9a and thereby equalize the water pressure throughout the interior of the water distributing means. The baffles 9 separate the chambers and therefore allow an equal pressure of water to be distributed over the entire inner surfaces of the porous tube, and this enables the water from the inlet 4 and the conduit 6 to flow uniformly through the porous tube at any point along the height of the tube. This allows the water from the water distributing means to pass uniformly into the salt bed in a horizontal or lateral direction at any point along the length of the porous tube. In addition the porosity of the tube 7a can equally satisfactorily be varied along the length of the tube to enable a variation of the water flow rate through the tube at different heights in the salt bed 3.

The bottom 32 of the water distributing means is structurally connected to the upper part of the conical structure designated 21. The conical structure forms the upper part of the sludge removal unit generally designated as 12, and the sludge removal unit is supported on the outlet conduit means 15 through which the impurities and sludge are removed from the vessel. The calcium sulfate particles released from the dissolved salt crystals are heavier than water and this causes their settling within the vessel to form a sludge bed 13 at the vessel bottom. However, since the calcium sulfate is also soluble to a certain extent in the brine formed there is a certain amount of the undesired calcium sulfate which passes out with the purified brine. The inlet 11 shown at the bottom of the vessel 1 provides water for removal of the sludge. The water passes into the bottom of the vessel through the sludge removal unit 12 and picks up sludge during its passage and then passes in an upward direction through the removal conduits 14, and then downwardly through the larger sludge outlet conduit 15 at the bottom of the dissolver.

In accordance with the invention the removal of impurities or sludge from the dissolver can be carried out in a number of manners, for example, the dissolver can be designed with a conical structure or the like at the bottom, such that the sludge can be removed simply by the use of a gravity flow-out system. The sludge can equally satisfactorily be removed from the dissolver apparatus of this invention by use of the technique shown in either the embodiment of FIGURE 1, or the embodiments shown in FIGURES 2–6 which utilize a screw conveyor means 24 to remove the sludge.

When the sludge is removed hydraulically as shown in FIGURE 1, the sludge removal rate through the unit 12 can satisfactorily be regulated by adjusting the flow of inlet water through the conduit 11. To start up the sludge removal unit 12 of FIGURE 1, the calcium sulfate or sludge impurities in the bottom of the dissolver must first be allowed to rise to a height such that a seal is placed around the bottom 21a of the cone 21. Once the seal is effected, the inlet flow of water through conduit 11 passes upwardly into the removal unit 12 and then out into the sludge bed 13. The water then mixes with and picks up the sludge and carries it through the outlet conduits 14 up into the larger outlet conduit 15 for passage out of the dissolver. The seal formed by the calcium sulfate around the bottom of the cone and the flow of water into the sludge bed from the conduit 11 prevents the salt bed 3 from backing up into the sludge removal unit, and the sludge is allowed to pass through the conduits 14 due to the venting action exerted by the tubular conduit 20 which extends through the central portion of the conduit 6 and out the top of the dissolver as shown by the upper extended portion 20a of the vent. Unless a vent is provided, then the pressure head controlling the flow of liquid through the sludge removal conduits 14 will be a function of the vertical distance from the brine level at the top of the dissolver to the water level at the bottom of the sludge outlet conduit 15. Since air is released when the brine is formed, the result would be that intermittently some air would be present in the sludge outlet conduit causing a variable head. This in turn would cause sludge removal to be irregular and wold disrupt the seal at 21a. With the vent provided by conduit 20, the effective head is established by the brine level at the top of the dissolver and the top of the sludge removal conduits 14. This head will be constant at all times regardless of any air released in the cone during the dissolving process, and therefore, sludge removal is allowed to proceed smoothly.

The salt and brine from the bed 3 are prevented from backing up into the sludge removal unit by adjusting the inward flow of water through the conduit 11, which supplies enough water to the sludge removal unit to stir up sludge bed 13 and mix it with the inlet water which then picks up the sludge and passes it outwardly through the conduits 14 and 15. For the purpose of controlling the sludge removal unit 12, if the water flow rate through the conduit 11 is decreased below the equilibrium flow rate, then the brine and salt will back up into the sludge removal unit; on the other hand if the flow rate of water through the conduit 11 is increased excessively above the equilibrium flow rate, this will cause the sludge from the bed 13 to pass up into the salt bed 3 and intermix therewith.

The impurities in the sludge bed 13 shown in FIGURE 2 are satisfactorily removed by simply adjusting the variable screw conveyor means generally designated 24, such that the screw 25 removes the sludge at a rate sufficient to keep the sludge level from rising above and interfering with the distribution of water from the water distribution means 7.

The brine solution which is formed by passage of the water through the salt bed 3 moves outwardly in a lateral direction as shown by the plurality of arrows 10 and then through the perforated screen 16 which is shown at the outer portion of the vessel 1. This screen is of cylindrical shape and can satisfactorily be formed of Monel metal or other corrosion resistant material. The screen has small openings 17 uniformly distributed over the entire surface of the screen and spaced apart therein, for example, the openings can be 0.050 inch holes spaced slightly over ⅛ inch apart. The diameter of the perforated screen is selected on the basis of parameters such as, salt particle size, mass throughputs of the salt and water, height of the salt bed, percent saturation desired in the outlet brine, and the like. The use of the screen results in efficient operation of the dissolver because it enables better separation of the high sludge area on the inside of the screen from the low sludge area on the outside of the screen in the annular passage area 18. The annular passage area is vented to the atmosphere, for removal of any air which gathers in the passage area, by means of openings 40. The screen acts as a further separator to remove any remaining impurities or sludge from the brine as the brine passes into the annular passage or outlet area 18 of the vessel. Any impurities which do pass through the screen still are caused to settle into the sludge bed 13 due to the low rate at which the brine passes upwardly to the outlet through the annular passage.

Another embodiment of the lateral flow rock salt dissolver of this invention is illustrated in FIGURE 2 wherein vessel 1 is shown having a water inlet conduit 4 at the upper portion 5 thereof, which conduit delivers water to the water distributing means 7 at the central portion of the tank. The water then passes outwardly through the holes 8 into the area of the distribution means separated by baffles 9 to form chambers 9a. The water then passes through the porous tube structure 7a of the water distribution means 7 in a lateral direction into the salt bed 3, and then passes in a lateral direction through the salt bed to form the purified brine. As the water passes in a lateral direction outwardly through the salt bed, the calcium sulfate particles released during the dissolution of the salt settle to the bottom of the tank, which as shown in the embodiment of FIGURE 2 is a conical structure 22 as opposed to the flat bottom 23 in the FIGURE 1 vessel. The sludge 13 collects in the conical container at the bottom of the FIGURE 2 vessel and is then removed from the vessel by screw conveyor means 24. The screw conveyor means referred to in this invention can satisfactorily be comprised of a variable speed screw 25 for purposes of sludge removal. The variable speed screw allows different removal rates of the sludge dependent upon the particular water and salt feed rates intended to be used in the rock salt dissolver. Sludge 13 from the sludge removal screw can equally satisfactorily be conveyed either to a disposal unit, or to a secondary dissolver for further reprocessing and purification of the salt remaining in the sludge. The brine formed during the dissolution of the salt from the laterally outwardly flowing water passes through the perforated screen 16 into the annular passage or outlet area 18 formed between the screen and the interior surface of the vessel, then in an upward direction to the brine outlet or outlets 19 at the top of the vessel.

Another embodiment of the lateral flow rock salt dissolver of the invention is illustrated in FIGURES 3 and 4 wherein the dissolver vessel generally designated 42 is of rectangular cross section with the water distributing means generally designated 77 disposed in a vertical position along the side 44 of the vessel. The dissolver vessel is comprised of an upper portion 41 connected to a flared-out section 43 which together generally define a salt storage area 2. The flared-out section is structurally attached to the rectangular portion of the vessel formed by walls 44, 45, 47 and 49 within which is contained the salt bed 3. The dissolver 42 is also comprised of a V-shaped bottom portion 51 which contains the sludge bed 13. At the bottom of the dissolver there is illustrated a screw conveyor means generally designated 24 which is used to remove sludge from the vessel.

The water distributing means 77 are of square-shaped cross section with porous walls 46 on one side only. The inlet water to the dissolver enters through conduits 4, then passes downwardly and through the holes 8 into the chambers 9a which are separated by baffles 9. The feed water then passes through the porous wall 46 of each water distributing means to pass in a lateral direction through the salt bed 3 as shown by the plurality of arrows 10. The brine passes through the salt bed in a lateral direction and then through the perforated screen 48 into the outlet passage area 50 where any impurities still remaining in the brine are allowed to settle into the sludge area 13 due to the slow upward flow rate in the outlet passage 50. At the top of the outlet passage there is illustrated an opening 40 for the purpose of venting off any air which gathers in the passage between the screen 48 and the wall 49 of the vessel. The brine upon reaching the passage area flows in an upward direction for removal through the outlet or outlets 19.

A further embodiment of the invention wherein the flow of brine is in a lateral direction from the periphery to the center of the dissolver is illustrated in FIGURES 5 and 6. The dissolver of this embodiment as shown is cylindrically shaped and contains a screw conveyor means designated 24 at the bottom of the vessel for removing the sludge or impurities from the bed 13. Of course, this dissolver can equally satisfactorily be constructed such that it is generally of polygonal cross-section. The conical portion 22 at the bottom of the vessel is attached to the cylindrical wall 60 of the dissolver vessel, and the upper part of the cylindrical wall is attached to a flared-out portion 62 which together with the cylindrical wall 64 generally define the salt storage area 2. Each of the water distributing means designated 77 as shown in FIGURES 5 and 6 are of generally square-shaped cross section having a porous wall 46 on the side closest to the central part of the vessel. The inlet water to the distributing means is fed into the conduits 4 and then through the holes 8 into the chambers 9a separated by the baffles 9. The water then passes through the porous wall 46 along the entire height of the wall as shown by the plurality of arrows 10 and through the salt bed inwardly to the perforated screen 66. The brine then passes through the cylindrical-shaped screen and upwardly in the outlet passage area 68 to be removed through brine outlet 19. The brine outlet 19 can satisfactorily be operated by means of a siphon, pumping action, or the like. The outlet passage 68 also communicates with a conduit 70 to act as a vent for the removal of any air which collects inside the passage. In the embodiment as shown in FIGURES 5 and 6, the brine flow rates attainable are generally lower than the brine flow rates attainable with the embodiments such as shown in FIGURES 1–4. This is due to the convergent nature of the brine flow which passes inwardly in all directions to accumulate at the central portion of the FIGURE 5 dissolver for removal through the brine outlet.

With respect to the water distributing means shown in the embodiments of the invention in FIGURES 3–6, these water distributing means can equally satisfactorily be constructed in a unitary fashion through the use of a manifold arrangement, or in the alternative the water distributing means could be a series of manifold units placed one above the other and supplied by separate water inlets. Variations of the structure of the water distribution means in this regard should not be considered outside the scope of this invention.

The principal benefits of the lateral flow rock salt dissolver of the invention are as follows. First, the formation of air pockets and channeling that normally occurs in a vertical flow dissolver is eliminated. In the dissolver apparatus of this invention, the air is continually released from the water as the salt dissolves in it, and the air moves laterally with the brine to the perforated screen where it is vented off. Since there is only a small quantity of air released at any particular elevation in the bed at a particular time, no large air pockets are formed. This is in sharp contrast to the condition that exists when the air must escape vertically through a bed of fine salt in a vertical flow dissolver apparatus.

Second, in the lateral flow dissolver of the invention there is no problem with movement of sludge particles up into the bed as in a vertical up-flow dissolver. The packed salt bed tends to act as a filter as the brine moves in a lateral direction from the water distribution means. The sludge particles then move downward and away from the flow of the brine. When the apparatus of the invention is utilized in a tall unit, the flow from the water distribution means would be proportioned so as to be considerably greater near the top of the unit than at the bottom, thereby causing most of the brine to flow through comparatively sludge free salt.

Third, there is no major movement of brine through areas of high sludge concentration, such as occurs when a vertical flow dissolver apparatus is used. Also, there is improved economy of operation compared to either: (a) slurry type dissolvers in which the salt and its released impurities are contacted with water in vessels containing motor driven agitators, or (b) fluidized bed dissolvers which require high water velocities to suspend the bed. Further, no additional equipment, such as liquid cyclone separators, is required to separate the fine insolubles from the undissolved salt.

Fourth, a marked technical advantage of the lateral flow rock salt dissolver of the invention is that efficient utilization of floor space may be made because an increase in capacity is accomplished by extending the dissolver vertically rather than horizontally. This means that in actual commercial usage the capacity of a dissolver may be increased by simply enlarging the height thereof without using up additional floor space. This also enables more efficient operation because more accurate control of the water in the various zones throughout the height of the dissolver can be achieved.

In order to further illustrate the invention, the following examples are provided. It is to be understood, however, that the examples are included for illustrative purposes and are not intended to be limiting of the scope of the invention as set forth in the subjoined claims.

EXAMPLE I

The apparatus used was similar to that shown in FIGURE 1. It consisted of a 16 inch diameter by 24 inch height plastic tank with a 12 inch diameter by 22 inch high Monel perforated screen with 0.050 inch holes spaced slightly over ⅛ inch apart. The inlet water was connected to a water distribution means comprised of a 15 inch length of 1½ inch porous plastic tubing with 60 micron openings. The water inlet flow was approximately 35 gallons per hour and salt consumption from the salt bed was about 100 pounds per hour. The sludge removal was through two ¼ inch copper tubes 14 as shown in FIGURE 1, while the water flow for the sludge removal was about 4½ gallons per hour. The results obtained are shown in Table 1 below:

TABLE 1.—CALCIUM SULFATE CONTENT OF BRINE FROM LATERAL FLOW DISSOLVER (a) First day of operation.—Dissolver loaded with enough free (granular) sulfate to form a seal at bottom of cone and then operated for four hours so as to determine optimum operating conditions and to permit dissolver to attain some degree of equilibrium. No brine samples taken first day.

(b) Second day of operation.—Samples of brine taken at hourly intervals.

| Sample | P.p.m. CaSO₄ | Salinity, degrees |
|---|---|---|
| 1 | 262 | 80 |
| 2 | 220 | 95 |
| 3 | 307 | 99 |
| 4 | 488 | 99 |
| 5 | 306 | 100 |
| 6 | 338 | 100 |
| 7 | 384 | 100 |
| 8 | 414 | 100 |
| 9 | 204 | 100 |

(c) Third day of operation.—Sixteen days later.

| Sample | P.p.m. CaSO₄ | Salinity, degrees |
|---|---|---|
| 1 | 478 | 85 |
| 2 | 271 | 90 |
| 3 | 288 | 96 |
| 4 | 407 | 100 |
| 5 | 376 | 95 |
| 6 | 453 | 100 |
| 7 | 450 | 100 |
| 8 | 557 | 100 |
| 9 | 374 | 100 |
| 10 | 409 | 100 |

The fine rock salt used in this example was "C" tailings Louisiana rock salt containing 1.2% by weight calcium sulfate. As demonstrated by this example and the results shown in Table 1, a lateral flow dissolver apparatus in accordance with the invention was operated continuously for extended periods of time, to make saturated brine with an average dissolved calcium sulfate content below 500 p.p.m. from the "C" tailings Louisiana rock salt containing a starting concentration of 1.2% or 12,000 p.p.m. calcium sulfate.

EXAMPLE II

F.C. Northern rock salt which is roughly similar in particle size to the Louisiana "C" tailings, was run in the dissolver apparatus of FIGURE 1. The F.C. Northern rock salt had a starting calcium sulfate concentration of 1% by weight. The flow rate, equipment and procedures were similar to those used in Example I. The results obtained from dissolving F.C. Northern rock salt are shown in Table 2. As shown by the results in the Table 2, the calcium sulfate concentration was reduced to a value below approximately 950 p.p.m. by use of the lateral flow dissolver apparatus of this invention.

TABLE 2.—CALCIUM SULFATE CONTENT OF BRINE FROM LATERAL FLOW DISSOLVER USING F.C. NORTHERN ROCK SALT (a) First day of operation.[1]

| Sample | P.p.m. CaSO₄ | Salinity, degrees |
|---|---|---|
| 1 | 830 | 76 |
| 2 | 600 | 76 |
| 3 | [2] 830 | 86 |
| 4 | 1,670 | 91 |
| 5 | 830 | 99 |
| 6 | 880 | 99 |
| 7 | 935 | 100 |
| 8 | 730 | 100 |

(b) Second day of operation.

| Sample | P.p.m. CaSO₄ | Salinity, degrees |
|---|---|---|
| 1 | 280 | 35 |
| 2 | 778 | 95 |
| 3 | [2] 799 | 85 |
| 4 | 1,422 | 96 |
| 5 | 898 | 96 |
| 6 | 838 | 90 |
| 7 | 851 | 90 |
| 8 | 913 | 92 |
| 9 | 815 | 94 |

See footnotes at end of table.

(c) Third day of operation.

| Sample | P.p.m. CaSO₄ | Salinity, degrees |
| --- | --- | --- |
| 1 | 970 | 95 |
| 2 | 1,067 | 100 |
| 3 | 871 | 99 |
| 4 | 816 | 100 |
| 5 | 920 | 100 |
| 6 | 846 | 95 |
| 7 | 946 | 98 |
| 8 | ³ 926 | 95 |
| 9 | ³ 1,134 | 97 |
| 10 | 1,014 | 97 |

¹ Samples taken at hourly intervals.
² Samples taken after acid clean-out of water inlet.
³ Water input reduced from 35 to 18 gallons/hour.

As shown, the brine produced by Northern F.C. rock salt containing approximately 1% by weight calcium sulfate, was considerably better purity brine than would be available from a vertical flow dissolver. However, it did not approach the purity of brine made from the similar sized Louisiana rock salt made under the same conditions.

The size distribution of the salts used in the examples and also the impurities contained therein, are set out by the data shown in Table 3 below.

TABLE 3.—SIZE DISTRIBUTION OF SALT AND IMPURITIES IN LOUISIANA "C" TAILINGS AND "FC" NORTHERN ROCK SALTS

| | Salt | |
| --- | --- | --- |
| Screen (Tyler) | Louisiana "C" Tailings | "FC" Northern |
| +10 | 0.1 | 20.3 |
| +14 | 15.9 | 18.4 |
| +20 | 34.3 | 15.4 |
| +28 | 20.6 | 10.6 |
| +35 | 11.2 | 6.9 |
| +48 | 8.6 | 7.6 |
| +65 | 2.7 | 5.7 |
| −65 | 6.6 | 15.1 |

| Impurities (Insolubles remaining in dissolver) | | |
| --- | --- | --- |
| +14 | 0.4 | 1.4 |
| +20 | 7.6 | 4.2 |
| +28 | 5.0 | 3.7 |
| +35 | 5.0 | 3.7 |
| +48 | 26.4 | 4.6 |
| +65 | 30.7 | 4.1 |
| +115 | 19.3 | 6.7 |
| −115 | 5.6 | 71.6 |

While it will be apparent that the preferred embodiments of the invention disclosed are well calculated to fulfill the objects above state, it will be appreciated that the invention is susceptible to modification, variation and change without departing from the proper scope or fair meaning of the subjoined claims.

What is claimed is:

1. A method of dissolving rock salt to produce brine comprising the steps of:
   (a) introducing sodium chloride salt containing calcium sulfate impurities into a dissolver vessel,
   (b) radially introducing water for dissolving the salt into said vessel along at least one vertically disposed locus adjacent said salt,
   (c) dissolving said salt by distributing said water from said path such that the water flows unidirectionally into and through the salt in a lateral direction throughout the length of said locus,
   (d) separating calcium sulfate impurities and other impurities formed during dissolving of the salt,
   (e) removing said impurities through an outlet disposed proximate to the bottom of the vessel, and
   (f) removing the brine formed through a second outlet disposed proximate to the top of the vessel, whereby said second outlet being located at the top of the vessel facilitates said separating of impurities.

2. A method of dissolving rock salt to produce brine comprising the steps of:
   (a) introducing sodium chloride salt containing calcium sulphate impurities into a dissolver vessel,
   (b) radially introducing water for dissolving the salt into said vessel along the vertical axis thereof,
   (c) dissolving said salt by distributing said water unidirectionally outwardly from said vertical axis such that the flow of water through the salt is in a generally lateral direction,
   (d) separating calcium sulfate impurities and other impurities formed during dissolving of the salt,
   (e) removing said impurities formed during dissolving of the salt through an outlet disposed proximate to the bottom of the vessel, and
   (f) removing the brine formed through a second outlet disposed proximate to the top of the vessel, whereby said second outlet being located at the top of the vessel facilitates said separating of impurities.

3. A method of dissolving rock salt to produce brine comprising the steps of:
   (a) introducing sodium chloride salt containing calcium sulphate impurities into a dissolver vessel,
   (b) radially introducing water for dissolving the salt into said vessel along the vertical axis thereof,
   (c) dissolving said salt by distributing said water unidirectionally outwardly from said vertical axis such that the flow of water through the salt is in a generally lateral direction,
   (d) separating calcium sulfate impurities and other impurities formed during dissolving of the salt by a combined filtering action of a salt bed formed in the vessel and a cylindrically shaped screen disposed within the vessel and around the vertical axis thereof,
   (e) removing the impurities through an outlet disposed proximate to the bottom of the vessel, and
   (f) removing the brine formed through a second outlet disposed proximate to the top of the vessel, whereby said second outlet being located at the top of the vessel facilitates said separating of impurities.

4. A method of dissolving rock salt to produce brine comprising the steps of:
   (a) introducing sodium chloride salt containing calcium sulphate impurities into a dissolver vessel,
   (b) radially introducing water for dissolving the salt into said vessel along a vertically disposed locus located on the periphery of the vessel adjacent the inner surface thereof,
   (c) dissolving said salt by distributing said water from said locus such that the water flows unidirectionally into and through the salt in a lateral direction from said periphery toward the central axis of the vessel,
   (d) separating calcium sulfate impurities and other impurities formed during dissolving of the salt,
   (e) removing the impurities through an outlet disposed proximate to the bottom of the vessel, and
   (f) removing the brine formed through outlet means generally disposed centrally within said vessel and proximate to the top thereof, whereby said outlet means being located at the top of the vessel facilitates said separating of impurities.

5. A rock salt dissolver apparatus for use in forming brine from rock salt containing calcium sulfate and other relatively insoluble impurities, comprising a vessel for holding salt, inlet means for salt at the top of said vessel, inlet means for feeding water into the vessel, vertically disposed water distributing means connected with said water inlet means for distributing said water such that the water emanates outwardly toward the exterior of the vessel and flows through the vessel in a lateral direction to thereby dissolve the salt, separate calcium sulfate impurities therefrom, and form brine, said water distributing means being located centrally within said vessel, brine collecting means disposed in the wall of said vessel opposite said water distributing means, outlet means located proximate to the top of the vessel for removing the brine from the brine collecting means, and means located proximate to the bottom of the vessel for removing calcium sulfate and other impurities formed during dissolving of the salt, said last named means including a downwardly facing generally concave member, a vertically disposed generally cylindrical member attached to and extending downwardly from said concave member through the bottom of said vessel to provide an outlet for calcium sulfate and impurities, second water inlet means disposed in said cylindrical member and opening into the area beneath the concave member to stir-up said sludge, conduit means disposed near the end of said second water inlet means and opening into the interior of said cylindrical member for conducting sludge agitated by said second water inlet means into said cylindrical member and vent means extending from the apex of said conical member vertically through the top of the vessel.

References Cited

UNITED STATES PATENTS

| | | | |
|---|---|---|---|
| 466,152 | 12/1891 | Blackmore | 23—272 |
| 1,807,263 | 5/1931 | Walter | 23—267 |
| 2,921,842 | 1/1960 | List | 23—272.6 X |
| 3,307,914 | 3/1967 | Heiss | 23—312 |
| 3,145,087 | 8/1964 | Walker | 23—311 X |

FOREIGN PATENTS 637,912   3/1962   Canada.

NORMAN YUDKOFF, *Primary Examiner.*

S. EMERY, *Assistant Examiner.*